INVENTOR.
VERNON J. FOWLER
BY R. J. Frank
ATTORNEY.

INVENTOR.
VERNON J. FOWLER
BY R. J. Frank
ATTORNEY.

United States Patent Office 3,429,641
Patented Feb. 25, 1969

3,429,641
PROJECTION SYSTEM
Vernon J. Fowler, East Meadow, N.Y., assignor to General Telephone & Electronics Laboratories Incorporated, a corporation of Delaware
Filed Sept. 30, 1966, Ser. No. 583,350
U.S. Cl. 352—198   11 Claims
Int. Cl. G03b 21/00, 21/20; G02f 1/22

ABSTRACT OF THE DISCLOSURE

A projection system in which a polarized light beam is transmitted through a polarization modulator thereby varying the plane of polarization of the beam in response to variations in the voltage applied between the terminals of the modulator. From the modulator, the beam travels through a beam deflector which imparts a scanning motion thereto before being split into two components, one of which scans the image to be projected. The light from the image is received by a photodetector which, through an amplifier, controls the voltage applied to the terminals of the modulator. The second beam component travels through a plane polarizer which changes the variations in polarization to intensity variations such that the image is reconstructed on a screen.

---

This invention relates to projection viewing systems and in particular to a system for scanning an object with a light beam while displaying an enlarged image of the object on a screen.

Optical systems for projecting images of translucent slides are well known. In such systems, light is generally transmitted through the slide resulting in a light intensity on the screen which is less than that obtained when the slide is not interposed between the source and the screen. Projection systems of this type do not always provide as bright an image as may be required for a given application and it is therefore an object of my invention to provide a projection system which is capable of producing an extremely bright image on a screen.

Another object is to provide a projection system capable of displaying either transparent or opaque objects.

Still another object is to provide a projection system wherein the contrast of the displayed image may be controlled by the viewer and which may be employed to display either positive or negative images of an object.

Yet another object is to provide a projection system which can be used to display color and monochrome images of an object.

In accordance with my invention, a projection system is provided wherein a source of polarized light is modulated, deflected, and then split into two components to generate a first light beam component for scanning an object and a second light beam component for projecting an enlarged image of the object on a screen. The light emanating from incremental areas of the object (which light may be transmitted through the object or reflected therefrom) is converted by a photodetector to a voltage having a magnitude corresponding to the intensity of the light incident on the photodetector. This voltage is coupled to an optical modulator positioned between the light source and a beam deflector.

The polarized light emitted by the source is polarization modulated by an amount corresponding to the intensity of the light emanating from the object, at least one polarization component of the modulator light output being of constant intensity. The direction of propagation of the light leaving the modulator is controlled by the beam deflector so that it sweeps across a beam splitter in a predetermined scanning pattern. The beam splitter divides the scanning beam into first and second light beam components having first and second directions.

As the first beam component sweeps across the object, each incremental area of the object transmits or reflects light having an intensity corresponding to the brightness of that area of the object. Since the light in the first beam component illuminating the object is of constant intensity, the intensity of the light striking the photodetector is determined only by the characteristics of the object. The photodetector is sensitive only to intensity variations and therefore the polarization modulation on the light beam does not affect the voltage coupled back to the modulator. Thus, although the polarization modulation on the first beam component is controlled by the voltage applied to the modulator, the polarization modulation produced does not, in turn, affect the modulator.

The second beam component, in the form it leaves the beam splitter, would not produce a visible image on the screen since it has constant intensity, and the human eye responds only to changes in intensity and not to changes in polarization. Accordingly, the polarization moduation on this beam is converted to intensity modulation before the beam is projected onto the screen thereby producing a visible image.

In one embodiment of the invention, a high power laser having a polarized output is employed as the light source. The beam emitted by the laser is polarization modulated in the optical moduator, deflected, and divided into the two components by the beam splitter as previously described. The beam splitter transmits most of the energy in the beam to a polarization filter that converts the polarization variation in the beam to intensity variation for display on a screen. A smaller portion of the beam energy is directed toward the object illuminating it with a scanning constant-intensity polarization-modulated beam. Thus, the object is scanned by constant intensity light maintained in exact synchronism with the intensity varying light scanning the screen.

The photodetector receives the light reflected from the object and couples a voltage corresponding to the intensity of this light through an amplifier to the input of the polarization modulator. The amplifier permits the brightness and contrast of the object, as viewed by the photodetector, to be increased by amplifying intensity variations. Thus, the object may be viewed with dim light and a projected image produced which is considerably brighter and may have greater contrast than the object.

The system may be expanded to project an image in color by employing at least two light sources which emit different colors together with additional modulators and detectors. For example, in a typical color system employing red, green and blue laser light sources, color filters having corresponding colors are placed in front of each of three photodetectors and the detector outputs coupled to corresponding modulators. The outputs of the modulators are then combined and passed through a common beam deflector and beam splitter to scan the object and project a color image of the object on a screen.

The above objects of and the brief introduction to the present invention will be more fully understood and further objects and advantages will become apparent from a study of the following description in connection with the drawings, wherein.

Figure 1:
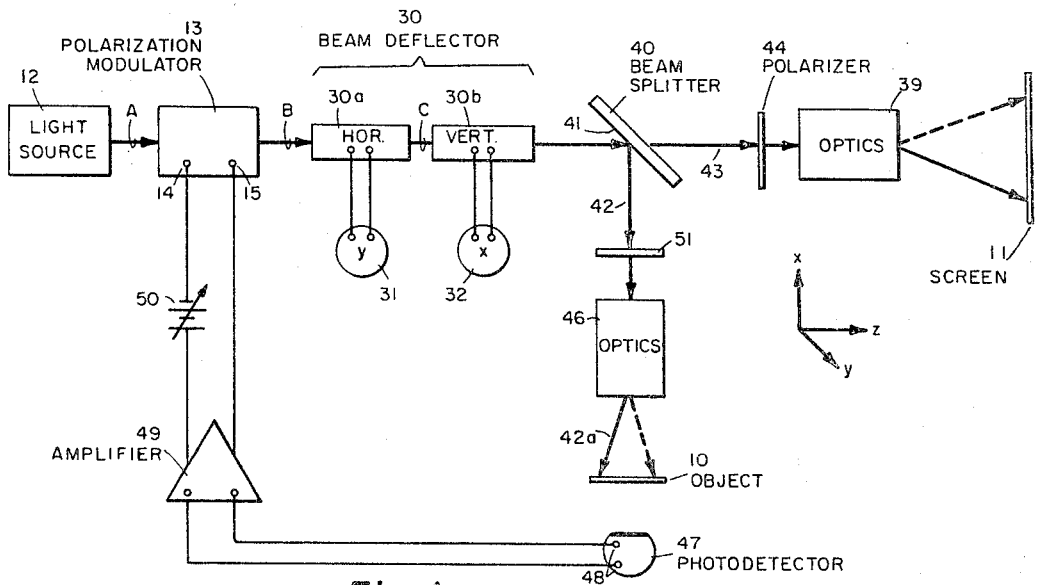
FIG. 1 is a block diagram of a projection system embodying my invention.

Referring to FIG. 1, there is shown a block diagram of my system for projecting an image of an object, such as a translucent photographic slide 10, on a screen 11. The light source 12 for the system is preferably of high intensity and must provide a polarized output. The output may be elliptically, circularly or plane-polarized and may be provided by the light source, or by an external polarizer located in the beam from an unpolarized source.

While any light source may be used, the laser is best suited because it is capable of very high brightness and its output is coherent. Since it emits coherent light, all of the energy in the beam may be concentrated in an extremely small area on the screen. The active medium in the laser may be solid, liquid or gas, an ion gas laser employing argon having been found well suited to this application.

The polarized light emitted by source 12 is plane polarized at 45° to the $x$ and $y$ axes and is propagated in the $+z$ direction (indicated by the coordinate axes) impinging upon a polarization modulator 13. The light emerges from the modulator as a polarization modulated beam having constant intensity for the $x$ and $y$ directions of polarization, the modulation corresponding to the magnitude of the varying voltage applied to the input terminals 14 and 15.

Figure 2:
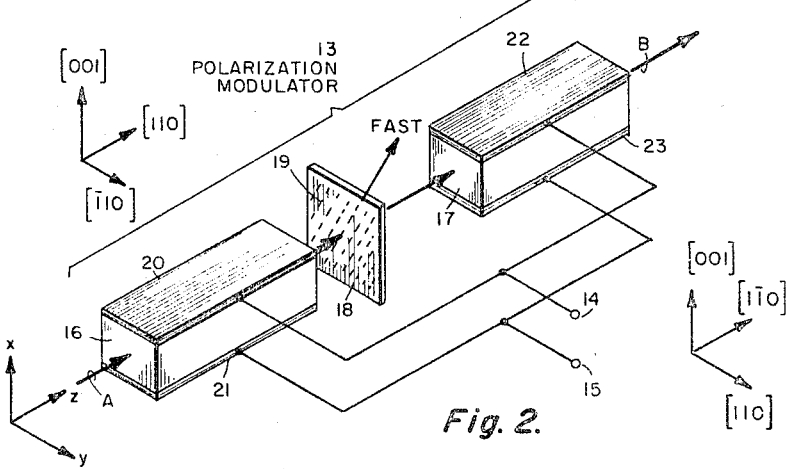
FIG. 2 illustrates one form of polarization modulator for use in the projection system.

A typical polarization modulator suitable for this application is shown in FIG. 2. The modulator consists of first and second electro-optic crystals 16 and 17 oriented so that the birefringence presented to the beam from source 12 in the absence of an electric field is identical for both crystals. Crystals 16 and 17 which may be made, for example, of potassium dihydrogen phosphate (KDP), have principal axes along the $x$ and $y$ axes of the system and are separated by a half-wave plate which takes the plane polarization component in the $x$ direction in crystal 16 and rotates it to the $y$ direction in the crystal 17. The half-wave plate is oriented so that its fast axis is at 45° to the $x$ direction as indicated by dashed lines 19. Input terminals 14 and 15 are coupled to conductive layers 20 and 21 on crystal 16 and to conductive layers 22 and 23 on crystal 17 thereby applying electric fields across both crystals in the [001] (optic axis) direction.

With this crystal orientation, the $x$ component of light polarization undergoes as it passes through crystals 16 and 17 an average phase shift which is proportional to the difference between the ordinary and extraordinary indices of refraction of the crystals. Application of a voltage between terminals 14 and 15 produces an electric field across the crystals in the [001] direction which adds to the large fixed crystal birefringence. This field induces a positive phase shift for light polarized along $[\bar{1}10]$ in crystal 16 and a phase shift of equal magnitude in the opposite direction for light polarized along [110] in crystal 17. This phase shift is proportional to the magnitude of the electric field impressed across crystals 16 and 17.

The half-wave plate 18 interchanges the ordinary and extraordinary rays in the two crystals thereby compensating for the fixed birefringence of the crystals. This is desirable because the fixed birefringence varies with the light beam direction and thus limits the angular aperture and makes the alignment of the elements in the projection system critical.

Figure 3A:
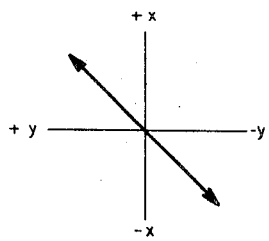
FIGS. 3a and 3b show the polarization states of light entering and leaving the modulator of FIG. 2.
Figure 3B:
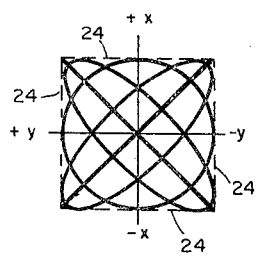

The polarization state of the light entering modulator 13 at point A is shown in FIG. 3a and the polarization states of the light emerging from the modulator at point B are shown in FIG. 3b. As indicated in FIG. 3a, the light emerging from source 12 is polarized in a plane perpendicular to the $z$ direction and at an angle of 45° to the $x$ and $y$ directions. The polarization states for the light emerging at point B vary from linear at 45° to the $x$ and $y$ axes when the voltage applied to terminals 14 and 15 is zero, to circular to elliptical. Light absorption in the polarizer is minimal and therefore, indicated by the dashed lines 24, the light leaving modulator 13 does not vary appreciably in intensity.

The light output of polarization modulator 13 is next transmitted through beam deflector 30 which deflects it in the $x$–$y$ plane in response to voltages applied by $y$ and $x$ voltage sources 31 and 32 to horizontal section 30a and vertical section 30b respectively. The beam deflector may comprise rotating mirrors, electro-optic apparatus or a deflecting device of the type disclosed in my copending U.S. patent application Ser. No. 518,324 filed Jan. 3, 1966.

In the beam deflector disclosed in my copending application the angle of the light beam is altered by means of a plurality of mirrors affixed to a series of synchronously controlled piezo-electric blocks. As shown in the partial top view of FIG. 4, light enters the horizontal deflector section 30a at B striking the surface of a reflecting wedge 35. The light is reflected from wedge 35 to a reflecting surface of a piezoelectric block 36, then to a second piezoelectric block 37 following a zig-zag path until it strikes wedge 35' and emerges from the deflector at point C.

In the absence of an applied voltage, the input beam is incident upon the central portion of the reflecting surfaces of the piezoelectric blocks as shown by the solid line between points B and C. When a voltage is applied across the piezoelectric blocks, they are rotated causing their reflecting surfaces to tilt deflecting the beam with respect to the longitudinal axes 38 as shown by the dashed line.

Figure 4:
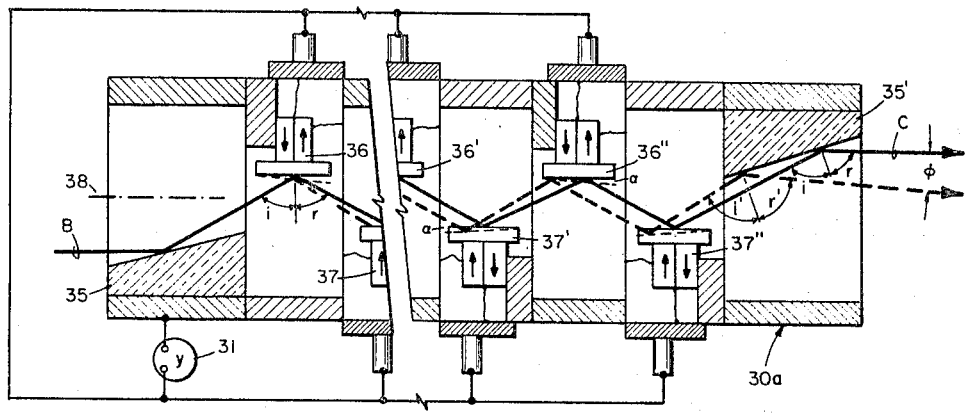
FIG. 4 depicts one form of light beam deflector useful in the system of FIG. 1.

The deflector section 30a shown in FIG. 4 changes the direction of propagation of the beam in the $y$–$z$ plane only. Accordingly, a second section 30b, rotated 90° with respect to section 30a, is employed to deflect the beam in the $x$–$z$ plane. The beam deflector is described in greater detail in the aforementioned patent application Ser. No. 518,324.

The beam emerging from beam deflector 30 is divided by a beam splitter 40 having a partially reflecting surface 41 into a first component 42 and a second component 43. The beam splitter 40 transmits most of the light to form component 43 and diverts a small part of the light (usually less than 10%) to form beam component 42.

The light in beam 43 is of substantially constant intensity and, therefore, if it were projected on screen 11 no image would be produced. However, by transmitting it through a plane polarizer 44 having its polarizing axis at 45° to the $x$ and $y$ axes, the polarization variations are changed to intensity variations and an image corresponding to the voltage applied across modulator terminals 14 and 15 is produced. An optical system 39 comprising conventional lenses is provided to focus the beam so that it will scan a desired portion of the screen.

The beam component 42 is diverted by beam splitter 40 to a second optical system 46 which focuses the beam to scan the slide 10. The light transmitted through slide 10 is received by a photodetector 47 which responds only to the intensity variation in the light incident thereon. Since the light 42a illuminating slide 10 is of constant intensity, the only intensity variation in the light incident on photodetector 47 are those caused by the pattern on the slide. Thus, the voltage appearing across detector terminals 48 is proportional to the intensity of the radiation entering photodetector 47 and corresponds to the pattern on slide 10. This voltage is amplified by amplifier 49 and coupled to input terminals 14 and 15 of polarization modulator 13. A variable direct voltage source 50 is coupled in series with amplifier 42 and one of the modulator terminals to permit adjustment of the linearity of modulator 13 thereby obtaining optimum contrast and brightness of the projected image. The projected image resolution is limited by the minimum spot which the laser 12 can produce, and the brightness of the image is limited by the output power of the laser. Within these limitations, the contrast of the image can be controlled by varying the gain of amplifier 49.

The positioning of polarization modulator 13 in the narrow output beam of laser 12 is considerably more efficient than if the modulator were placed in the diverging beam between beam splitter 40 and screen 11. The arrangement of FIG. 1 is operable because the intelligence impressed on the output beam of the modulator is represented only by variations in polarization, and these polarization variations are not coupled back to the input of the modulator due to the insensitivity of photodetector 47 to changes in polarization.

As indicated in FIG. 3b, the intensity of the beam scanning the object is constant and therefore the only intensity variations applied to modulator 13 should be those due to the reflectance or transmissivity of object 10. However, it has been found that some objects exhibit dichroism and convert the polarization variations in the scanning beam to intensity variations. As a result, light variations at the output of the modulator are fed back to its input and the image displayed on screen 11 is distorted. If the object 10 exhibits dichroism, a plane polarizer 51 having its axis along a direction of constant intensity may be inserted between beam splitter 40 and optics 46; i.e. polarizer 51 would transmit only light polarized, for example, in the y direction of FIG. 1. While this reduces the intensity of the light reaching object 10, it assures that there will be not polarization variations in the object scanning beam which might be converted by the object to intensity variations.

As illustrated in FIG. 1, the scanning beam 42a may be transmitted through a translucent slide 10 to the photodetector 47. Alternatively, if the object 10 is opaque, the photodetector may be placed in front of the object 10 and energized by light transmitted from the object.

Figure 5:
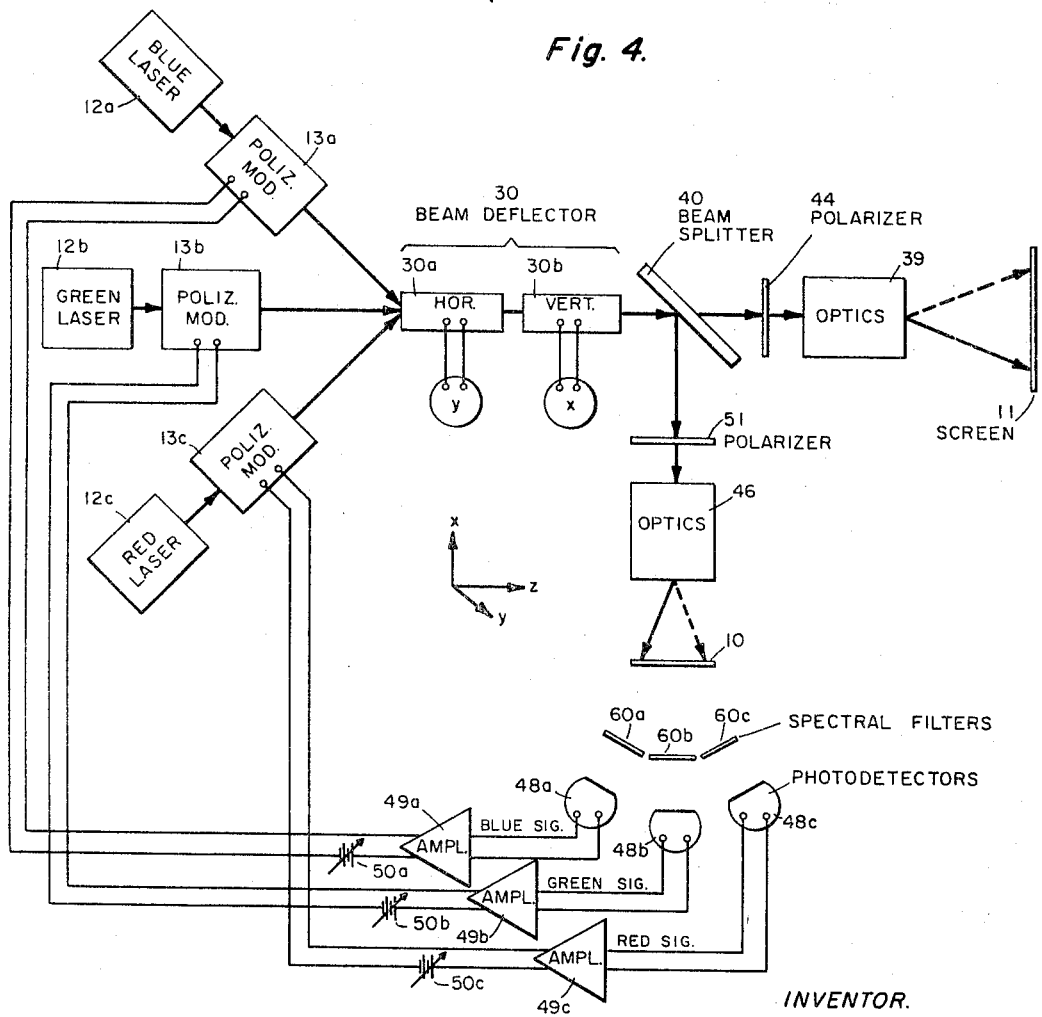
FIG. 5 is a block diagram of a system for projection of a three-color image.

FIG. 5 shows a projection system embodying my invention which is capable of displaying a three-color image of the object 10. This system is similar to that of FIG. 1 except that three lasers 12a, 12b and 12c emitting blue, green and red light respectively are used in place of the single laser 12. The blue and green emitting lasers 12a and 12b may employ argon as the active medium and the red-emitting laser 12c krypton. It is also possible to use a single argon laser to provide blue light from one end and green from the other by the use of interference filters.

Three polarization modulators 13a, 13b and 13c receive the light from each of the lasers 12a, 12b and 12c respectively. The modulators are energized by the outputs of photodetectors 48a, 48b and 48c through amplifiers 49a, 49b and 49C respectively. The light transmitted through object 10 impinges upon detectors 48a–48c after passing through blue, green and red filters 60a, 60b and 60c.

In operation, light beams from blue, green and red-emitting lasers 12a, 12b and 12c are separately modulated by polarization modulators 13a, 13b and 13c and then combined in beam deflector 30. The beams may be combined without appreciable loss of light by using dichroic mirrors or by coupling the beams into deflector 30a at slightly different angles, as shown. In all other respects, operation of the three-color system is the same as for the system of FIG. 1.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:
1. A projection system for displaying an image of an object comprising
  (a) a source of polarized light,
  (b) polarization modulation means having a pair of input terminals positioned adjacent said source of polarized light, said modulation means polarization modulating the light beam emitted by said source in response to signals applied to said input terminals, the light emerging from said modulator having a constant intensity for at least one component of polarization,
  (c) deflection means positioned adjacent said polarization modulation means for deflecting said modulated light beam,
  (d) beam splitting means positioned adjacent said deflection means, said beam splitting means dividing said light beam into first and second polarization-modulated constant-intensity beam components having first and second directions, said first beam component illuminating the object to be displayed,
  (e) detector means responsive to the intensity of light emanating from said object, said detector means having output means coupled to the input terminals of said polarization modulation means, and
  (f) polarization filter means positioned within the second polarization modulated constant-intensity beam component, said filter means converting the variations in polarization in said second beam component to intensity variations for projection on a viewing surface.

2. A projection system for displaying an object as defined by claim 1 wherein said polarization filter means comprises a plane polarizer positioned between said beam splitting means and said object, said polarizer being positioned with its plane of polarization oriented along a direction of polarization having constant intensity.

3. A projection system for displaying an object as defined by claim 1 wherein said source of polarized light is a laser.

4. A projection system for displaying an object as defined by claim 1 wherein said source of polarized light is plane polarized and said polarization filter comprises a plane polarizer having its plane of polarization corresponding with the plane of polarization of said source.

5. A polarization system for displaying an object as defined by claim 1 wherein the means coupling said detector means to the input terminals of said polarization modulation means is an amplifier.

6. A projection system for displaying an object as defined by claim 1 wherein said polarization modulation means comprises first and second spaced electro-optic crystals having first and second pairs of electrodes affixed respectively thereto, a half wave plate located between said first and second electro-optic crystals and means for coupling said input terminals across said first and across said second pairs of electrodes.

7. A projection system for displaying an image of an object comprising
  (a) a laser, the light beam generated by said laser being plane polarized,
  (b) a polarization modulator having a pair of input terminals positioned adjacent said source of polarized light, said modulation means polarization modulating the light beam emitted by said source in response to signals applied to said input terminals, the light emerging from said modulator being polarization modulated in accordance with the magnitude of the voltage applied across said input terminals and having a constant intensity for at least one component of polarization,
  (c) a light beam deflector positioned at the output of said polarization modulator for changing the direction of propagation of the beam emerging from said modulator in accordance with a predetermined signal,
  (d) a beam splitter positioned at the output of said light beam deflector, said beam splitter dividing said light beam into first and second polarization modulated constant-intensity beam components having first and second directions, said first beam component scanning the object to be displayed, (e) a photodetector responsive to the intensity of the light emanating from said object and non-responsive to changes in the polarization of said light, said photodetector producing a voltage at its output proportional to said light intensity, (f) an amplifier, said amplifier coupling the output of said photodetector to the input terminals of said polarization modulator, and (g) a plane polarizer positioned within the second polarization-modulated constant-intensity beam component, said plane polarizer having its plane of polarization corresponding with the plane of polarization of said laser, said plane polarizer converting the variations in polarization in said second beam component to intensity variations for projection on a viewing surface.

8. A projection system of the type defined by claim 7 wherein a plane polarizer is positioned between said beam splitter and said object, the plane of polarization of said plane polarizer being oriented along a direction of polarization having constant intensity.

9. A projection system of the type defined by claim 7 wherein said polarization modulator comprises (a) first and second spaced electro-optic crystals having first and second pairs of electrodes affixed respectively thereto, (b) a half-wave plate located between said first and second electro-optic crystals, said half-wave plate being oriented so that its fast axis coincides with the direction of polarization of the light emitted by said laser, and (c) a pair of input terminals coupled across said first pair of electrodes and across said second pair of electrodes.

10. A projection system for displaying images of an object in color comprising (a) at least two sources of polarized light having different colors and having corresponding planes of polarization, (b) a plurality of polarization modulators, each provided with a pair of input terminals, one of said polarization modulators being positioned adjacent each of said sources of polarized light, the light emerging from each of said modulators being polarization modulated in accordance with the magnitude of the voltage applied across its respective input terminals and having a constant intensity for at least one component of polarization, (c) a light beam deflector positioned at the output of said polarization modulators, said deflector receiving the beams from said modulators, combining them, and varying the direction of propagation of the combined beam in accordance with a predetermined signal, (d) a beam splitter positioned at the output of said light beam deflector, said beam splitter dividing said light beam into first and second polarization modulated constant-intensity beam components having first and second directions, said first beam component scanning the object to be displayed, (e) a plurality of photodetectors positioned adjacent said object, one of said photodetectors being provided for each source of polarized light, (f) a plurality of spectral filters, one of said filters being positioned between said object and each of said photodetectors, each of said filters transmitting light of a different color corresponding to the color of one of said sources of polarized light, said photodetectors producing voltages at each of their output terminals proportional to the intensity of the light incident thereon, (g) a plurality of amplifiers coupling each of said photodetectors to the input terminals of a corresponding polarization modulator, and (h) a plane polarizer positioned within the second polarization modulated constant-intensity beam component, said plane polarizer having its plane of polarization corresponding with the plane of polarization of said sources of polarized light, said plane polarizer converting the variations in polarization in said second beam component to intensity variations for projection onto a viewing surface.

11. A projection system for displaying images of an object in color as defined by claim 10 wherein the number of light sources, modulators, photodetectors, spectral filters and amplifiers is three and the colors of the beams emitted by said sourecs of polarized light and transmitted through said filters are red, green and blue respectively.

References Cited

UNITED STATES PATENTS

| | | | |
|---|---|---|---|
| 1,788,470 | 1/1931 | Nyquist | 350—150 X |
| 2,309,048 | 1/1943 | Curry | 350—150 X |
| 3,304,428 | 2/1967 | Peters | 350—150 X |

JOHN M. HORAN, *Primary Examiner.*

M. H. HAYES, *Assistant Examiner.*

U.S. Cl. X.R.

350—150, 151